United States Patent
Hwang et al.

(10) Patent No.: US 7,668,574 B2
(45) Date of Patent: Feb. 23, 2010

(54) BROADCASTING RECEIVER AND POWER SUPPLY CONTROL METHOD THEREOF

(75) Inventors: Sun Ho Hwang, Seoul (KR); Ho Jun Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 498 days.

(21) Appl. No.: 11/601,627

(22) Filed: Nov. 20, 2006

(65) Prior Publication Data
US 2007/0124790 A1  May 31, 2007

(30) Foreign Application Priority Data
Nov. 30, 2005  (KR) .................. 10-2005-0115475

(51) Int. Cl.
*H04B 1/16* (2006.01)
(52) U.S. Cl. .................... 455/574; 455/343.1
(58) Field of Classification Search ........... 455/572, 455/574, 343.1, 343.2, 343.3, 343.4, 343.5, 455/343.6
See application file for complete search history.

(56) References Cited

U.S. PATENT DOCUMENTS

| | | | | |
|---|---|---|---|---|
| 5,422,681 A | * | 6/1995 | Hayashi | 348/730 |
| 6,681,122 B2 | * | 1/2004 | Dwornik | 455/557 |
| 6,690,655 B1 | * | 2/2004 | Miner et al. | 370/278 |
| 6,748,246 B1 | * | 6/2004 | Khullar | 455/574 |
| 2003/0153369 A1 | * | 8/2003 | Laiho et al. | 455/574 |
| 2004/0259605 A1 | * | 12/2004 | Quigley et al. | 455/574 |
| 2005/0122976 A1 | * | 6/2005 | Poli et al. | 370/392 |
| 2005/0265398 A1 | * | 12/2005 | Chapman et al. | 370/509 |
| 2007/0082716 A1 | * | 4/2007 | Behzad et al. | 455/574 |

FOREIGN PATENT DOCUMENTS

| | | |
|---|---|---|
| CN | 1581962 A | 2/2005 |
| EP | 1505835 A1 | 2/2005 |
| JP | 2005-218006 | 8/2005 |
| WOWO | 2004/054227 (A2) | 6/2004 |

* cited by examiner

*Primary Examiner*—Blane J Jackson
(74) *Attorney, Agent, or Firm*—McKenna Long & Aldridge LLP

(57) ABSTRACT

A broadcasting receiver and a power supply control method based on an operation mode are disclosed. Power supply is cut off to a data transmission/reception processing block corresponding to a mode, not determined as the operation mode. Therefore, it is possible to prevent unnecessary power consumption and lengthen the lifetime of the broadcasting receiver.

12 Claims, 3 Drawing Sheets

BROADCASTING RECEIVER AND POWER SUPPLY CONTROL METHOD THEREOF

This application claims the benefit of Korean Patent Application No. 10-2005-0115475, filed on Nov. 30, 2005, which is hereby incorporated by reference as if fully set forth herein.

BACKGROUND OF THE INVENTION

1. Field of the Invention

The present invention relates to a broadcasting receiver, and more particularly, to a method for controlling power supply to a data transmission channel in a broadcasting receiver which is capable of receiving a cable broadcast.

2. Discussion of the Related Art

In general, a cable broadcasting system basically consists of a cable broadcasting station which is a transmitting side transmitting a cable broadcast, and a cable broadcasting receiver which is a receiving side receiving the transmitted cable broadcast.

The cable broadcasting station may also be referred to as a system operator (SO) head-end or multiple system operator (MSO) head-end.

The cable broadcasting receiver is of an open cable type wherein a cable card including a conditional access (CA) system is separated from the receiver body. The cable card may also be referred to as a Point Of Deployment (POD) module, and can be detachably mounted in a slot of the body of the cable broadcasting receiver.

The receiver body in which the cable card is inserted may also be referred to as a host. Namely, the combination of the cable card and the host is called the cable broadcasting receiver.

Data services for transmission and reception of various data in cable broadcasting roughly include two modes. One is an Out Of Band (OOB) mode, and the other is a DOCSIS Settop Gateway (DSG)-associated mode.

In the DSG-associated mode, data is transmitted and received using a cable modem. In the OOB mode, data is transmitted and received using a channel.

In other words, a broadcast program is transmitted and received using an in-band channel irrespective of whether the current operational mode is the DSG-associated mode or OOB mode, and data information other than the broadcast program, for example, service information (SI), is transmitted and received using an OOB channel in the OOB mode and a cable modem in the DSG-associated mode.

At this time, the OOB mode and the DSG-associated mode are not used together, but only one thereof is set and used as the operational mode according to the cable card, head-end and host.

For this reason, the power supply for the other mode, not actually used, wastes as much power. That is, provided that power supply is made for the unused mode, the user will use a product with problems, such as an unnecessary waste of power, a waste of money and a reduction in lifetime of components.

SUMMARY OF THE INVENTION

Accordingly, the present invention is directed to a broadcasting receiver and a power supply control method thereof that substantially obviate one or more problems due to limitations and disadvantages of the related art.

An object of the present invention is to provide a broadcasting receiver and a power supply control method thereof wherein power supply for an unused mode is controlled so as to prevent unnecessary power consumption of a data transmission/reception channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power supply control method of a broadcasting receiver comprises a power supply control method of a broadcasting receiver, comprising, determining whether an operational mode is a first mode or second mode, cutting off power to a data transmission/reception processing block associated with the second mode if the operational mode is determined to be the first mode, and cutting off power to a data transmission/reception processing block associated with the first mode if the operational mode is determined to be the second mode. The first mode may be any one of an Out Of Band (OOB) mode and a DOCSIS Settop Gateway (DSG)-associated mode, and the second mode is the other one.

In another aspect of the present invention, a power supply control method of a cable broadcasting receiver comprises determining an operational mode, and cutting off power to a data transmission/reception processing block associated with a mode, not determined as the operational mode.

In another aspect of the present invention, a power supply control method of a cable broadcasting receiver comprises determining whether an operational mode is an OOB mode or DSG-associated mode, cutting off power to a circuit for processing of DSG data if the operational mode is determined to be the OOB mode, and cutting off power to a circuit for processing of OOB data if the operational mode is determined to be the DSG-associated mode.

In yet another aspect of the present invention, a broadcasting receiver comprises a host, herein the host may include an OOB mode processor for receiving OOB data and demodulating the received OOB data or modulating it to transmit it externally, a DSG mode processor for receiving DSG data and demodulating the received DSG data or modulating it to transmit it externally, and a power supply controller for cutting off power supply to any one of the OOB mode processor and DSG mode processor according to whether an operational mode is an OOB mode or DSG-associated mode.

The power supply controller may cut off power to the DSG mode processor if the operational mode is determined to be the OOB mode, and power to the OOB mode processor if the operational mode is determined to be the DSG-associated mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

The present invention is characterized in that a cable broadcasting receiver, which supports both an OOB mode and a DSG-associated mode, cuts off the supply of power for a currently unused one of the modes.

Figure 1:
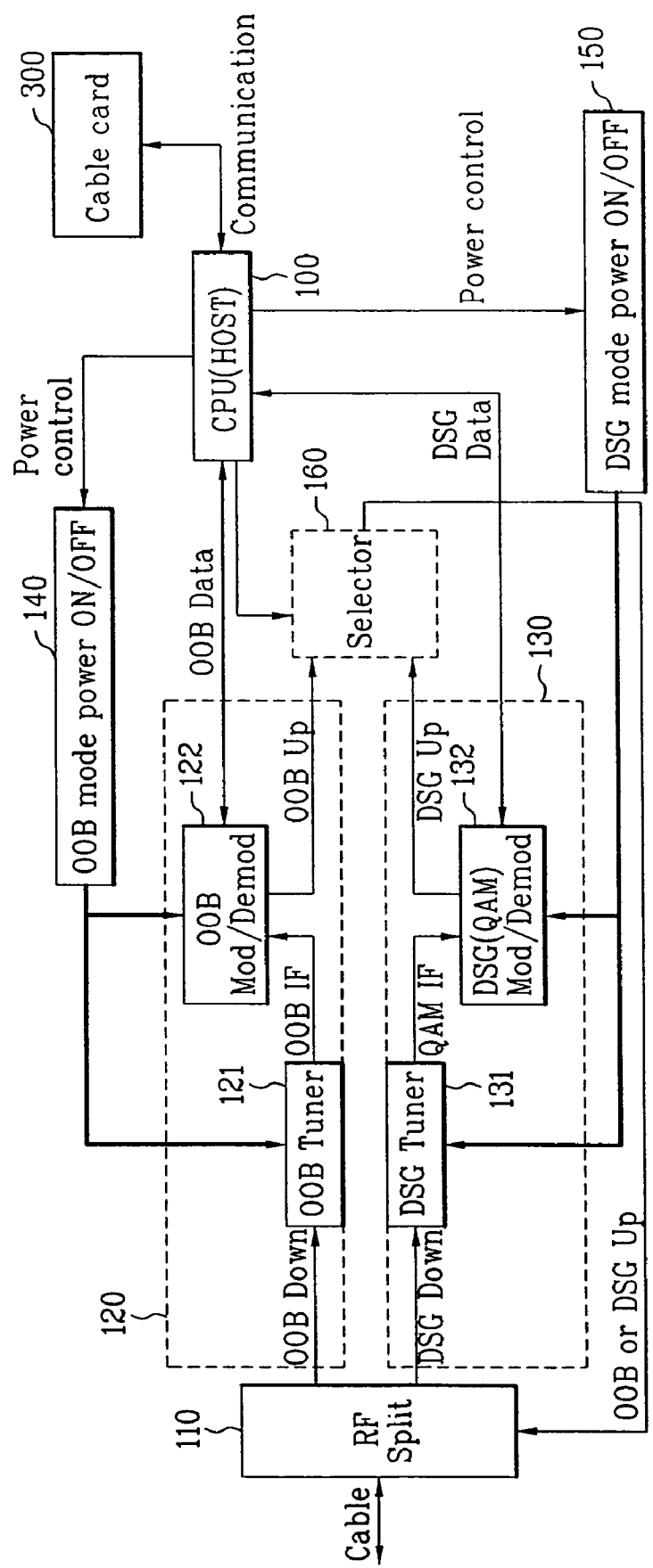
FIG. 1 is a block diagram showing one embodiment of a cable broadcasting receiver according to the present invention.

FIG. 1 is a block diagram showing one embodiment of such a cable broadcasting receiver according to the present invention. In FIG. 1, only parts for transmission/reception of data information, such as service information, are shown, whereas in-band channel-associated parts for reception and processing of a broadcast program are omitted.

Referring to FIG. 1, a host includes a central processing unit (CPU) 100, radio frequency (RF) splitter 110, OOB mode processor 120, DSG mode processor 130, OOB mode power controller 140, DSG mode power controller 150, and selector 160. A cable card 300 can be detachably mounted onto the host.

The OOB mode processor 120 processes data transmitted and received in the OOB mode.

The DSG mode processor 130 processes data transmitted and received in the DSG-associated mode.

The OOB mode processor 120 includes an OOB tuner 121 and an OOB modulator/demodulator 122, and the DSG mode processor 130 includes a DSG tuner 131 and a DSG modulator/demodulator 132.

The OOB mode power controller 140 and the DSG mode power controller 150 may be separately provided as shown in FIG. 1, or may be integrated into one unit.

In the aforementioned configuration according to the present embodiment, the OOB tuner 121 of the OOB mode processor 120 tunes a data broadcast of a specific frequency transmitted through a cable in the OOB mode and outputs the tuned data broadcast as an OOB data signal OOB IF to the OOB modulator/demodulator 122. The OOB modulator/demodulator 122 quadrature phase shift keying (QPSK)-demodulates the OOB data signal OOB IF and outputs the QPSK-demodulated signal to the cable card 300 through the CPU 100. That is, because a QPSK transmission scheme is adopted in the OOB mode, the demodulation is also performed in a QPSK manner at the receiving side.

OOB data (for example, pay program application, receiver status information, user input, etc.) transmitted from the cable card 300 is also inputted to the OOB modulator/demodulator 122 of the OOB mode processor 120 through the CPU 100, which then modulates the inputted OOB data in the QPSK manner and transmits the modulated OOB data to a cable broadcasting station through the selector 160.

Meanwhile, the DSG tuner 131 of the DSG mode processor 130 tunes a data broadcast of a specific frequency transmitted through the cable in the DSG-associated mode and outputs the tuned data broadcast as a DSG data signal QAM IF to the DSG modulator/demodulator 132. The DSG modulator/demodulator 132 demodulates the DSG data signal QAM IF in a quadrature amplitude modulation (QAM) manner and outputs the QAM-demodulated signal to the cable card 300 through the CPU 100. DSG data (for example, pay program application, receiver status information, user input, etc.) transmitted from the cable card 300 is also inputted to the DSG modulator/demodulator 132 of the DSG mode processor 130 through the CPU 100, which then modulates the inputted DSG data in the QAM manner and transmits the modulated DSG data to the cable broadcasting station through the selector 160.

The selector 160 is switched to any one of the OOB modulator/demodulator 122 of the OOB mode processor 120 or the DSG modulator/demodulator 132 of the DSG mode processor 130 under control of the CPU 100.

The OOB mode power controller 140 supplies or cuts off power to the OOB mode processor 120 under the control of the CPU 100.

The DSG mode power controller 150 supplies or cuts off power to the DSG mode processor 130 under the control of the CPU 100.

The CPU 100 determines an operational mode in communication with the cable card 300 and controls the selector 160, OOB mode power controller 140 and DSG mode power controller 150 according to the determined operational mode.

If the operational mode is determined to be the OOB mode, the selector 160 selects and outputs the modulated OOB data from the OOB modulator/demodulator 122 under the control of the CPU 100. If the operational mode is determined to be the DSG-associated mode, the selector 160 selects and outputs the modulated DSG data from the DSG modulator/demodulator 132 under the control of the CPU 100.

Also, in the case where the operational mode is determined to be the OOB mode, the OOB mode power controller 140 supplies power to the OOB mode processor 120 under the control of the CPU 100, and the DSG mode power controller 150 cuts off power to the DSG mode processor 130 under the control of the CPU 100. That is, no power is supplied to the DSG mode processor 130.

Conversely, in the case where the operational mode is determined to be the DSG-associated mode, the OOB mode power controller 140 cuts off power to the OOB mode processor 120, and the DSG mode power controller 150 supplies power to the DSG mode processor 130. That is, no power is supplied to the OOB mode processor 120.

In other words, because the OOB mode processor 120 and the DSG mode processor 130 perform similar functions and desired data is actually transmitted and received through only one of the two processors, the supply of no power to the other processor has no effect on the data transmission/reception.

Therefore, in the present embodiment, the operational mode is determined, and power to the DSG mode processor 130 is cut off if the determined operational mode is the OOB mode and power to the OOB mode processor 120 is cut off if the determined operational mode is not the OOB mode.

Figure 2:
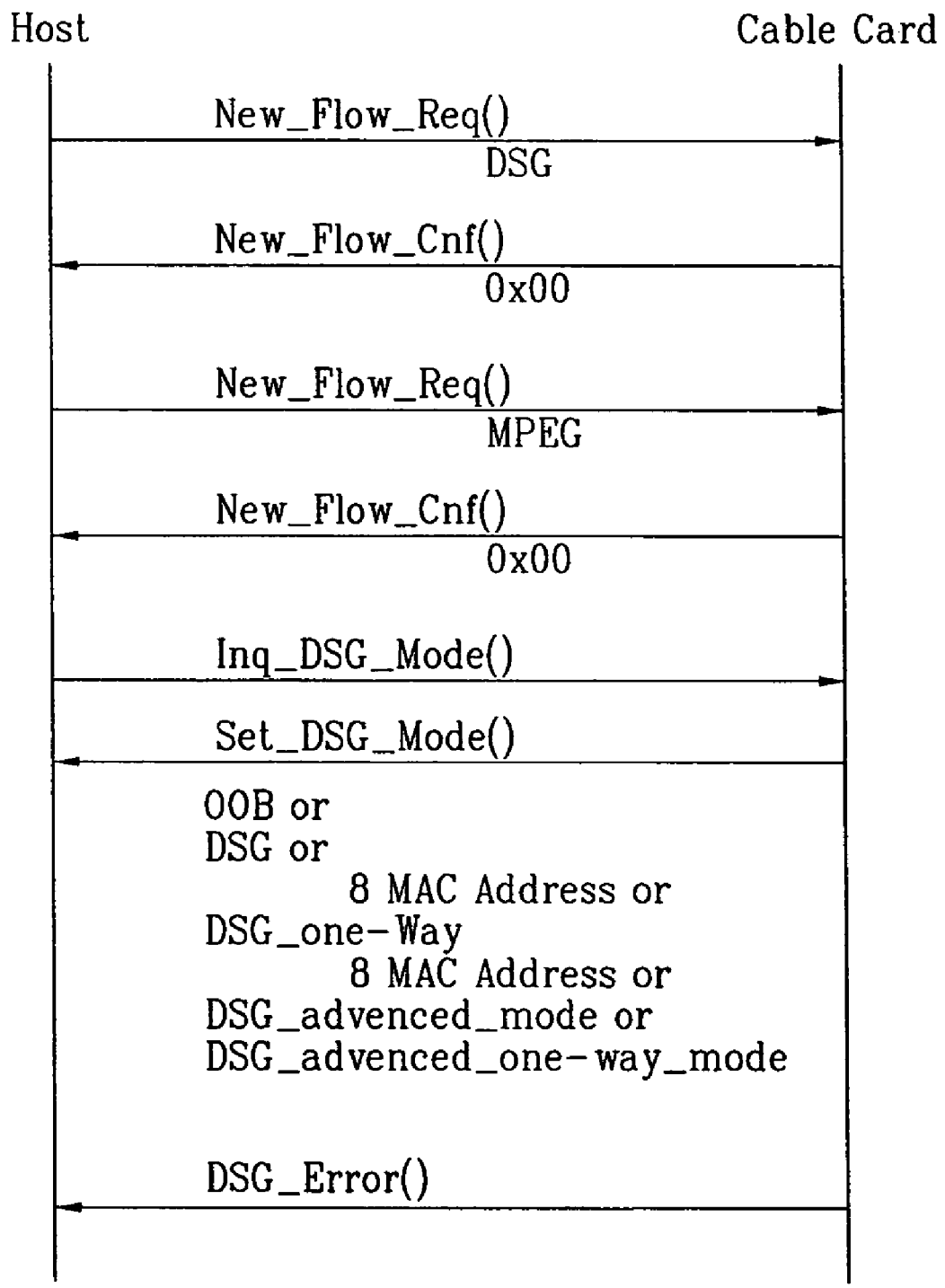
FIG. 2 is a flowchart illustrating one embodiment of an operational mode determination process according to the present invention.

The operational mode determination may be made in various ways, one example of which is shown in FIG. 2.

The CPU 100 of the host determines the operational mode in communication with the cable card 300, and FIG. 2 shows an example where the CPU 100 of the host sets the DSG-associated mode as the operational mode in communication with the cable card 300 according to an extended channel support (ECS) protocol.

Referring to FIG. 2, the CPU 100 of the host transmits a new_flow_req(DSG) application protocol data unit (APDU) to the cable card 300, which then replies with a new_flow_cnf (DSG, 0x00) APDU to set a DSG flow.

If the DSG flow is set, the CPU 100 transmits a new_flow_req(MPEG_SECTION) APDU to the cable card 300, which then replies with a new_flow_cnf(MPEG_SECTION, 0x00) APDU to set an MPEG section flow.

Thereafter, the CPU 100 transmits an inquire_DSG_mode( ) APDU to the cable card 300 to inquire what is the current operational mode. Then, the cable card 300 replies with a Set_DSG_mode( ) APDU containing information regarding the OOB or DSG-associated mode. That is, the cable card 300 transmits a Set_DSG_mode( ) APDU with a factor corresponding to a selected one of the OOB mode, a DSG mode, a DSG_one-way mode, a DSG_advanced_mode and a DSG_advanced_one-way_mode to the CPU 100. As a result, the CPU 100 sets the operational mode based on the Set_DSG_mode( ) APDU.

The above-described operational mode determination process of FIG. 2 is nothing but one embodiment for the operational mode determination, and any other well-known method may be used for the operational mode determination.

Figure 3:
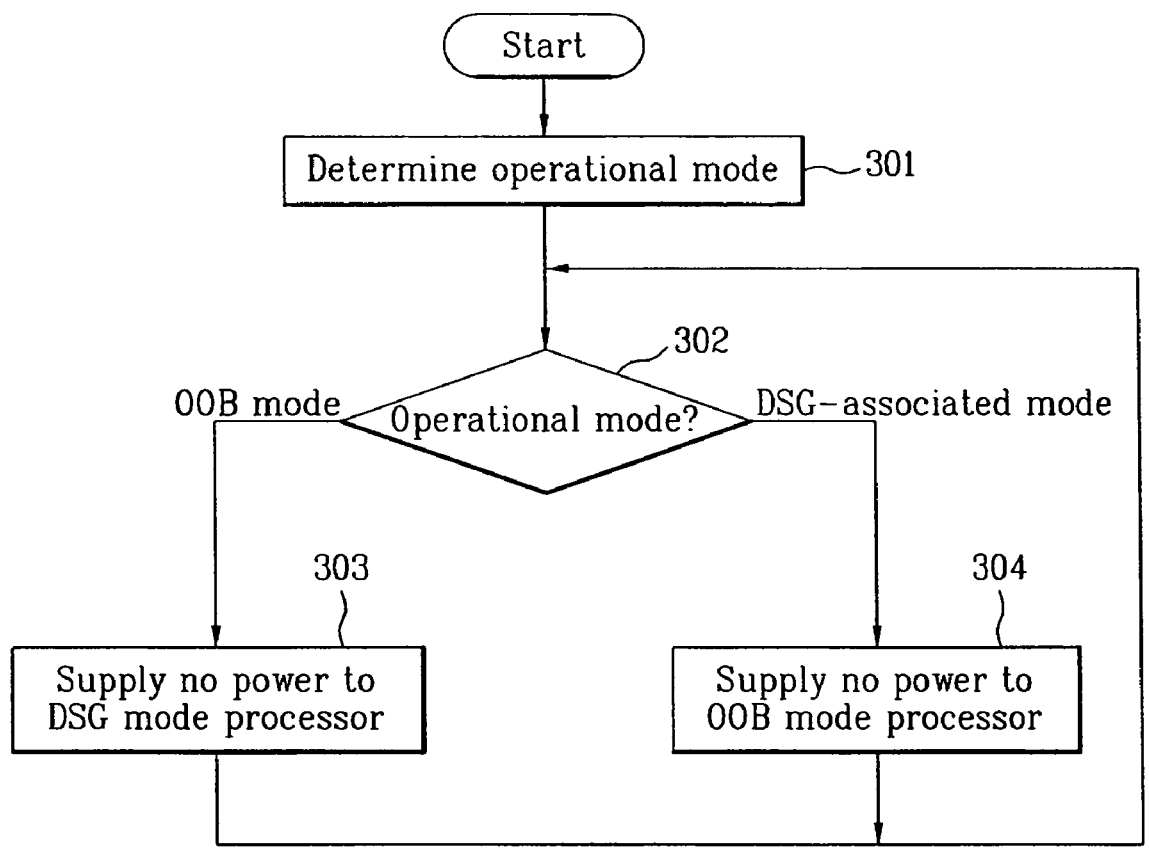
FIG. 3 is a flowchart illustrating one embodiment of a power supply control method according to the present invention.

FIG. 3 is a flowchart illustrating a process of determining the operational mode and controlling power supply according to the determined operational mode.

The operational mode is determined in the above-stated method or any other well-known method (Step 301). If the operational mode is determined to be the OOB mode (Step 302), no power is supplied to the DSG mode processor 130 (Step 303). Conversely, if the operational mode is determined to be the DSG-associated mode (Step 302), no power is supplied to the OOB mode processor 120 (Step 304).

In this manner, only one mode is determined as the operational mode according to the cable card, head-end and host. Therefore, according to the present invention, no power is supplied to circuits, not actually used, thereby making it possible to reduce a waste of power.

As apparent from the above description, according to the broadcasting receiver and power supply control method of the present invention, power supply is cut off to a data transmission/reception processing block corresponding to a mode, not determined as the operational mode. Therefore, it is possible to prevent unnecessary power consumption and lengthen the lifetime of the receiver.

It will be apparent to those skilled in the art that various modifications and variations can be made in the present invention without departing from the spirit or scope of the invention. Thus it is intended that the present invention covers the modification and variations of this invention provided they come within the scope of the appended claims and their equivalents.

What is claimed is:

1. A method of reducing a power supply in a digital broadcasting receiver including a host and a cable card, the method comprising:

determining whether an operational mode is an OOB mode or a DSG-associated mode based on a communication between the host and the cable card, wherein the host further identifies the operational mode using information regarding the operational mode transmitted from the cable card;

cutting off power to a circuit for processing of DSG-associated data if the operational mode is determined to be the OOB mode; and cutting off power to a circuit for processing of OOB data if the operational mode is determined to be the DSG-associated mode.

2. The method according to claim 1, the determining step further including:

transmitting a first application protocol data unit (APDU) requesting for setting a DSG flow from the host to the cable card;

transmitting a second APDU requesting for setting an MPEG section flow from the host to the cable card if set the DSG flow;

transmitting a third APDU requesting for inquiring what is the operational mode from the host to the cable card if set the MPEG section flow; and determining what is the operational mode based on a response signal corresponding to the third APDU.

3. A digital broadcasting receiver comprising a host, the host including:

an OOB mode processor for receiving OOB data and demodulating the received OOB data or modulating it to transmit it externally;

a DSG mode processor for receiving DSG data and demodulating the received DSG data or modulating it to transmit it externally; and a determining unit for determining whether an operational mode is an OOB mode or a DSG-associated mode based on a communication between the host and a cable card, wherein the host further identifies the operational mode using information regarding the operational mode transmitted from the cable card;

a power supply controller for cutting off power supply to any one of the OOB mode processor and DSG mode processor according to whether the operational mode is the OOB mode or the DSG-associated mode.

4. The digital broadcasting receiver according to claim 3, the receiver further comprising:

a first transmitting unit for transmitting a first application protocol data unit (APDU) requesting for setting a DSG flow from the host to the cable card;

a second transmitting unit for transmitting a second APDU requesting for setting an MPEG section flow from the host to the cable card if set the DSG flow;

a third transmitting unit for transmitting a third APDU requesting for inquiring what is the operational mode from the host to the cable card if set the MPEG section flow, wherein the determining unit further determines what is the operational mode based on a response signal corresponding to the third APDU.

5. The digital broadcasting receiver according to claim 3, wherein the power supply controller cuts off at least power to the OOB mode processor if the operational mode is the DSG-associated mode and the power supply controller cuts off at least power to the DSG mode processor if the operational mode is the OOB mode.

6. The digital broadcasting receiver according to claim 3, wherein the power supply controller comprises:

an OOB mode power controller for controlling the power supply to the OOB mode processor according to the operational mode; and a DSG mode power controller for controlling the power supply to the DSG mode processor according to the operational mode.

7. The digital broadcasting receiver according to claim 3, wherein the DSG-associated mode is any one of a DSG mode, DSG_one-way mode, DSG advanced mode and DSG_advanced_one-way mode.

8. The digital broadcasting receiver according to claim 3, wherein the OOB mode processor comprises:
an OOB tuner for receiving OOB data transmitted from a broadcasting station; and
an OOB modulator/demodulator for demodulating OOB data outputted from the OOB tuner, or modulating OOB data inputted thereto for transmission to the broadcasting station.

9. The digital broadcasting receiver according to claim 3, wherein the DSG mode processor comprises:

a DSG tuner for receiving DSG data transmitted from a broadcasting station; and
a DSG modulator/demodulator for demodulating DSG data outputted from the DSG tuner, or modulating DSG data inputted thereto for transmission to the broadcasting station.

10. The digital broadcasting receiver according to claim 3, further comprising a cable card detachably mounted onto the host.

11. The digital broadcasting receiver according to claim 10, wherein the operational mode is determined through communication between the host and the cable card.

12. The digital broadcasting receiver according to claim 10, wherein the cable card transmits information regarding the operational mode to the host in response to a request from the host.

* * * * *